US009277206B1

(12) United States Patent
Lloyd et al.

(10) Patent No.: US 9,277,206 B1
(45) Date of Patent: Mar. 1, 2016

(54) DUAL-VIEW LASER-BASED THREE-DIMENSIONAL CAPTURE SYSTEM AND METHOD FOR EMPLOYING THE SAME

(71) Applicant: Cognex Corporation, Natick, MA (US)

(72) Inventors: Robert Lloyd, Muskego, WI (US); Laurens Nunnink, Simpleveld (NL)

(73) Assignee: COGNEX CORPORATION, Natick, MA (US)

( * ) Notice: Subject to any disclaimer, the term of this patent is extended or adjusted under 35 U.S.C. 154(b) by 361 days.

(21) Appl. No.: 13/751,367

(22) Filed: Jan. 28, 2013

(51) Int. Cl.
H04N 13/02 (2006.01)

(52) U.S. Cl.
CPC .................. *H04N 13/0271* (2013.01)

(58) Field of Classification Search
USPC ............. 348/49, 50, 54, 67, 44, 25, 135, 136, 348/169, 208.14, 217.1, 281, 333.1, 341, 348/349, 364, 658, 756, 779, 781; 356/3.1, 356/3.14, 3.16, 4.01, 21, 255, 398, 603, 356/606, 610, 612, 620; 353/28, 37, 48, 353/104; 359/292, 439, 440, 441, 443, 448, 359/449, 556, 584, 605, 719; 382/140, 154, 382/173, 260, 276, 312; 378/20, 14, 98.3, 378/206
See application file for complete search history.

(56) References Cited

U.S. PATENT DOCUMENTS

| 4,708,483 | A | 11/1987 | Lorenz |
|---|---|---|---|
| 4,787,748 | A | 11/1988 | Rioux |
| 4,796,997 | A | 1/1989 | Svetkoff et al. |
| 4,897,536 | A | 1/1990 | Miyoshi |
| 6,028,672 | A | 2/2000 | Geng |
| 6,522,777 | B1 | 2/2003 | Paulsen et al. |
| 6,657,216 | B1 | 12/2003 | Poris |
| 8,520,219 | B2 | 8/2013 | Shaw et al. |
| 8,755,053 | B2 * | 6/2014 | Fright et al. ................... 356/604 |
| 2005/0193577 | A1 * | 9/2005 | Sergyeyenko et al. ........... 33/290 |
| 2007/0189456 | A1 * | 8/2007 | Haras ........................... 378/98.5 |
| 2008/0024795 | A1 * | 1/2008 | Yamamoto et al. ............ 356/612 |
| 2008/0170238 | A1 * | 7/2008 | Ochi et al. ..................... 356/610 |
| 2009/0103053 | A1 * | 4/2009 | Ichikawa et al. ................. 353/33 |
| 2009/0161031 | A1 * | 6/2009 | Kaise ................................. 349/5 |

(Continued)

OTHER PUBLICATIONS

Lu, et al "A Single-Camera System Captures High-Resolution 3D Images in One Shot", "Electronic Imaging & Signal Processing", Nov. 28, 2006, pp. 1-3, Publisher: SPIE Newsroom, Published in: US.

*Primary Examiner* — Jefferey Harold
*Assistant Examiner* — Mustafizur Rahman
(74) *Attorney, Agent, or Firm* — Loginov IP

(57) ABSTRACT

This invention provides a 3D laser capture system, and method for employing the same, that avoids a shadow effect and allows for straightforward set-up and use of the system in imaging the surface profile of an object. A camera is provided with a head assembly that includes a lens configuration and a pair of mirrors that generate two simultaneous views, of opposite object sides. The two views are projected by the mirrors and lens configuration onto discrete portions of the camera's image sensor. The separate images captured on each of the two portions of the sensor are both analyzed by the systems vision system processor, thereby allowing the processor's profiling algorithm to analyze the surface from two different viewing angles concurrently. Portions of the laser blocked in one view are generally visible in the other view. Alternatively, a second lens can be employed to provide a second field of view.

19 Claims, 5 Drawing Sheets

(56) References Cited

U.S. PATENT DOCUMENTS

| | | |
|---|---|---|
| 2009/0285357 A1* | 11/2009 | Khamene et al. ............... 378/20 |
| 2010/0177929 A1* | 7/2010 | Kurtz et al. .................. 382/103 |
| 2011/0123689 A1* | 5/2011 | Luckhardt et al. ............ 426/231 |
| 2012/0113397 A1* | 5/2012 | Hirao et al. .................... 353/37 |
| 2012/0188515 A1* | 7/2012 | Huang ............................ 353/31 |
| 2012/0236123 A1* | 9/2012 | Chen ............................... 348/47 |
| 2013/0169974 A1 | 7/2013 | Iwayama |
| 2013/0245996 A1 | 9/2013 | Haw et al. |

* cited by examiner

DUAL-VIEW LASER-BASED THREE-DIMENSIONAL CAPTURE SYSTEM AND METHOD FOR EMPLOYING THE SAME

FIELD OF THE INVENTION

This invention relates to vision system cameras and more particularly to vision system cameras adapted to image surface profiles.

BACKGROUND OF THE INVENTION

A laser beam profiler (also termed simply a "laser profiler") captures and determines the spatial intensity (three dimensional) profile of a fan or "curtain" of a laser beam at a particular plane transverse to the beam propagation path. In a conventional arrangement, a single camera captures the profile of the beam on the object surface. The camera typically resides above the surface plane and the camera lens axis resides at an acute angle (i.e. off-axis) relative to the plane so as to capture the deviation of the laser line upon the surface. This deviation represents the profile of the surface. Laser profilers are useful in a wide range of inspection and manufacturing operations where the user desires to measure and characterize surface details of a planar object via triangulation. One example is the inspection of keyboards in which the profiling task determines whether all keys are at a similar height. One form of laser profiler uses a vision system camera having an image sensor (or "imager") that can be based upon a CCD or CMOS design. The imager defines a predetermined field of grayscale or color-sensing pixels on an image plane that receive focused light from an imaged scene through a lens. In a typical arrangement, the profiler uses a particular lens assembly that directs reflected laser light from the planar scene to the sensor at an acute angle with respect to the camera sensor's optical axis (which is perpendicular to the image plane). In this manner, the non-perpendicular angle between the laser axis, lens axis and sensor's image plane can fulfill the so-called Scheimpflug principle so as to define a sharp image of the laser line at every measurement distance (described further below). That is, normally when a camera axis is directed at a non-perpendicular angle to a planar scene, only a small crossing width of the overall height of the acquired image is in sharp focus and the focus fades above and below this region.

Undesirably, conventional three-dimensional (3D) laser capture/profile systems generally suffer from a shadow effect, in which portions of the laser beam blocked by the target object result in blank zones in the resulting imaged 3D model of the object. This shadow effect can occur in a relatively deep vertical groove, or other similar surface feature—for example the teeth of a gear. Noise can also exist in various regions of an image, including those adjacent to the transition from a shadow area of the line. It is, thus, desirable to provide a 3D laser capture system that avoids this shadow effect. This arrangement should also desirably be straightforward to use and maintain, and relatively free of potential inaccuracy.

SUMMARY OF THE INVENTION

This invention overcomes disadvantages of the prior art by providing a 3D laser capture system, and method for employing the same, that avoids a shadow effect and allows for straightforward set-up and use of the system in imaging the surface profile of an object. The system includes a camera and a cylindrical laser. The camera is provided with a head assembly that includes a lens configuration and a pair of mirrors that generate two simultaneous views, respectively of two opposite sides of the object. The two views are projected by the mirrors and lens configuration onto discrete portions of the camera's image sensor (or "imager"). The separate images captured on each of the two portions of the sensor are both analyzed by the systems vision system processor, thereby allowing the processor's profiling algorithm to analyze the surface from two different viewing angles concurrently. In this manner, portions of the laser that are blocked in one view are generally visible in the other view, and combining the overall image data set yields a result that exhibits significantly less (or in many instances no) shadow effect. This arrangement allows for a more compact overall unit, with a single camera (that can use conventional optics) employed to acquire two separate images using a single laser, and reduced signal-to-noise since two images can be compared and any obvious noise filtered-out of the result. In embodiments, the optics can include a beam-splitting mirror to generate two images at the sensor. Alternatively, a second lens can be employed to provide a second field of view.

In an illustrative embodiment, a system for three-dimensional (3D) capture of a profile of an object surface using a vision system camera having an image sensor defining an image plane is provided. The system includes a laser assembly generating a fan of laser light constructed and arranged to project a laser line on an object surface. An optical assembly, in optical communication with the vision system camera is also provided. The optical assembly is constructed and arranged to direct light reflected from a first viewing angle of a region of the object surface that includes the laser line and a second, opposing viewing angle of the region of the object surface that includes the laser line. The light reflected from each of the first viewing angle and the second viewing angle is projected on a first area and a second area of the image sensor, respectively. A profiling process compares the image data of the first area and the image data of the second area. This profiling process uses the comparison results to generate a 3D profile line with respect to the object surface. Illustratively, the fan of laser light resides substantially along a plane perpendicular to the image plane and a direction of relative motion between the system/laser line and the object surface. In an embodiment, the system and laser line are stationary and the object moves with respect thereto. In general, the motion defines a sequence of predetermined increments in which one or more images (i.e. a scan) of the object are captured at each increment. The data generated by the system and method is used to generate a volumetric 3D image of the object surface. In an embodiment, the optical assembly comprises a beam splitter receiving light from a pair of spaced-apart mirrors located between the beam splitter and the object surface. The spaced-apart mirrors are illustratively oriented at similar and opposite angles with respect to a plane defined by the fan of laser light. The beam splitter directs light through a lens assembly of the vision system camera. This lens assembly can be a conventional fixed or removable lens assembly, such as a conventional C-mount lens. Alternatively, the optical assembly comprises a pair of lenses each having an optical axis oriented at an opposing acute angle with respect to a plane defined by the fan of laser light. Each of the lenses receives light from respective of a pair of spaced-apart mirrors located between the lenses and the object surface. For each of the first viewing angle and the second viewing angle, in combination, the plane defined by the fan of laser light, the optical axis of a respective one of the lenses and the image plane can be arranged to satisfy the Scheimpflug condition. The optical assembly and the laser assembly are illustratively located within a housing that is removably attached to a housing of the vision system camera. The system housing can be adjusted to reside at a predetermined distance from the (sensor) image plane along the camera sensor's optical axis (perpendicular to the image plane). Illustratively, the profiling process is constructed and arranged to at least one of: one of (a) reconstruct shadow regions of an image of the laser line and (b) filter noise associated with the image of the laser line based upon a comparison of at least part of the image data of the first area and at least part of the image data of the second area.

In another embodiment, a method for capturing a three-dimensional (3D) profile of an object surface using a vision system camera having an image sensor defining an image plane is provided. This method includes the step of generating a fan of laser light to project a laser line on an object surface. In a further step, the method directs light reflected from a first viewing angle of a region of the object surface that includes the laser line and a second, opposing viewing angle of the region of the object surface that includes the laser line. In this manner, the light from each of the first viewing angle and the second viewing angle is projected on a first area and a second area of the image sensor, respectively. The image data of the first area and the image data of the second area are used to generate a 3D profile line with respect to the object surface.

BRIEF DESCRIPTION OF THE DRAWINGS

The invention description below refers to the accompanying drawings, of which.

DETAILED DESCRIPTION

Figure 1:
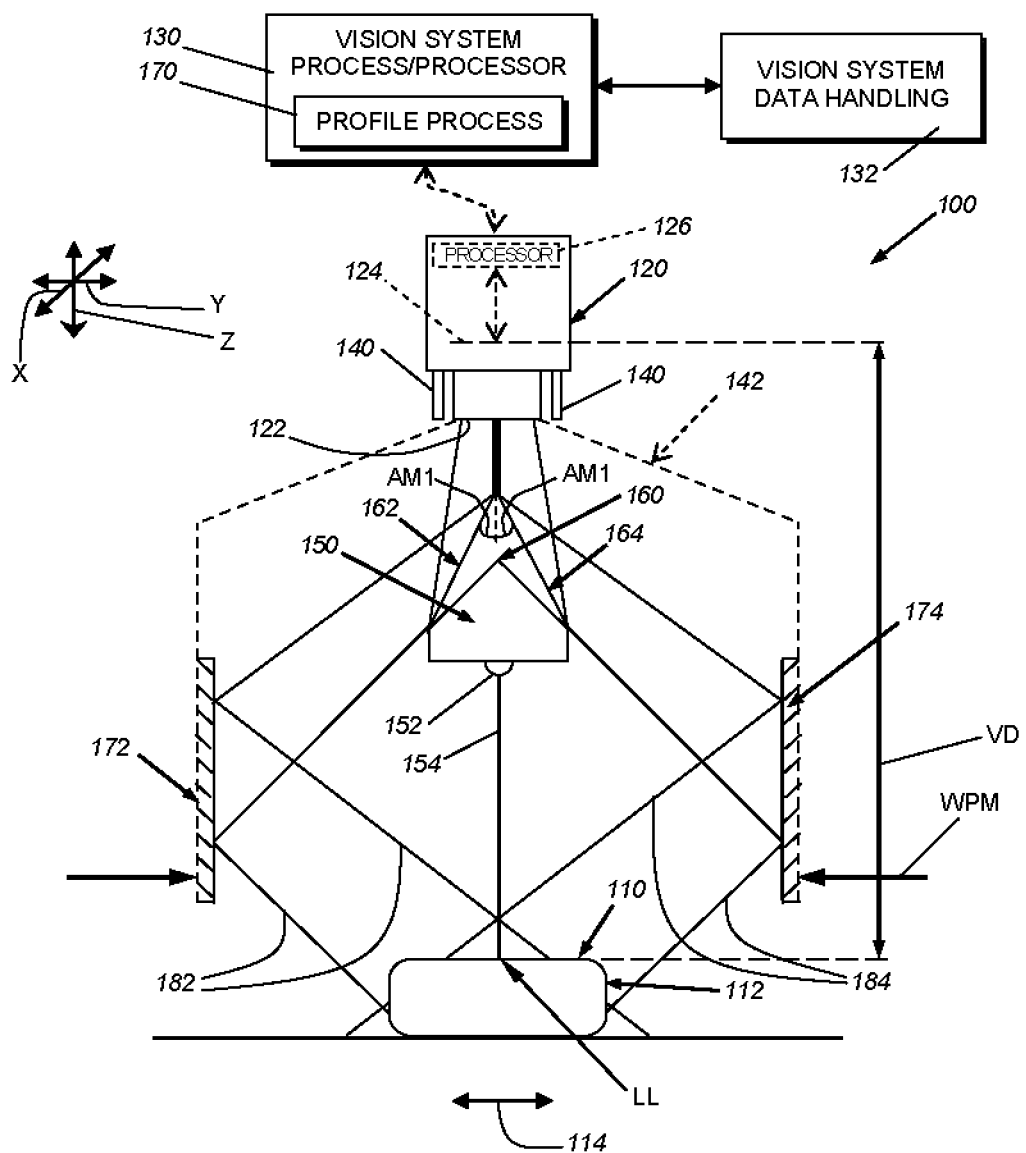
FIG. 1 is a schematic side view of an illustrative embodiment of a 3D laser capture system using a beam splitting mirror in conjunction with a single camera and lens arrangement.

FIG. 1 is a system 100 for 3D capture (profiling) of the surface 110 of an exemplary object 112. The object can be stationary or in relative motion (arrow 114) with respect to the system 100 along a predetermined direction. It is contemplated in instances of relatively motion that either of (or both) the system and the object moves. Where motion occurs, the system can perform a scan of the surface 110, by acquiring images (image frames) at each of a large number of locations along the surface. This is described further below.

The system 100 includes a vision system camera 120 that can be any appropriate camera assembly having a fixed or removable lens arrangement 122 that focuses received light onto an image sensor (or simply termed "sensor") 124 that defines the camera's image plane. The sensor is operatively connected to the camera's on-board processor assembly 126. The processor assembly 126 can control system operation and/or various regulation processes, including but not limited to, image capture, data storage, trigger handling, internal and external illumination control, contrast and/or brightness control, etc. The camera processor assembly 126 can also include vision system processor components that perform associated vision system processes 130. Such processes are used to analyze features in captured and stored image data and determine information related to such images. Common vision system processes and/or "tools", which should be clear to those of skill in the art, include edge detection, blob analysis, ID/symbol/code finding, alignment, trained pattern matching, etc. While some or all of these processes can be performed internally within the camera's on-board processing components, it is contemplated that the camera assembly can transfer some or all of the data from acquired images to a remote processing device, such as a PC running a vision system application. Appropriate wired and/or wireless links can be used to transfer such data between the camera assembly and a remote processing device. In many arrangements, the on-board or remote processor communicates with one or more data-handling devices 132 that use processed image data to perform manufacturing (or other) tasks and/or decisions. For example, the data can be used to stop an assembly line when an error is detected, or can be used to track objects on a line in the case of ID finding and reading. Likewise, the camera housing can include various visual and/or audible alerts that indicate an error or other condition requiring an operator's attention.

Note, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor here herein can be implemented using electronic hardware, software consisting of a non-transitory computer-readable medium of program instructions, or a combination of hardware and software.

With reference again to FIG. 1, the camera assembly includes supports 140 of any appropriate design that engage a housing 142 (shown in phantom). The housing 142 defines a "head" unit that is adapted to contain various optical components as described further below. While not shown, both the camera and the head unit can be interconnected by a mounting bracket assembly that assists in suspending the entire system 100 over an object on a line at an appropriate viewing distance VD (that, for the purposes of this description, is deemed to reside along the z-axis in an (x, y, z) coordinate system between the image plane defined by the sensor 124 and the surface 110). The housing 142 supports a laser assembly 150 having an optics assembly 152 that transmits a fan-shaped laser curtain 154, which generates a line at the location LL on the object surface 110. The curtain resides generally in a plane perpendicular to the page of the figure. Between the camera 120 and the laser assembly 150 is positioned a beam splitter 160. The beam splitter includes a pair of angled mirrors 162 and 164. These beam splitter mirrors are each oriented to be in optical communication with the lens assembly 122 and each of a pair of mirrors 172 and 174, respectively. The mirrors 172, 174 are each located at the far end of the housing 142. The mirrors 172, 174 are oriented along planes that are perpendicular to the plane defined by the image plane. These mirrors 172, 174 are depicted as parallel to each other (i.e. the planes they reside in are parallel) for illustrative purposes. Alternatively (as shown, for example, in the embodiment of FIG. 2) the mirrors can be oriented non-parallel with respect to each other—for example tapering outward so as to allow for a more-compact package). In general, the mirrors are symmetric about the plane defined by the laser fan so as to generate similar images (as described further below). The overall arrangement of mirrors generates the depicted path of reflected light rays 182 and 184 on each respective side of the object surface 110. As shown, the imaged region on the surface encompassed by each set of depicted rays (in each angled point of view) 182, 184 overlaps the other set, at least in part, to include the laser line.

The orientation of the mirrors 162, 164, 172 and 174 is constructed and arranged to allow two opposing points of view, each at an equal and opposite acute angle with respect to the surface. Thus, as the surface varies in height along the z-direction, the line at each point of view deviates similarly in each of opposing directions in each field of view. The specific angle AMS of each beam splitter mirror 162 and 164 with respect to the vertical plane (along the z-axis) is selected to direct the light received from each respective mirror 172 and 174 into each of opposing halves of the sensor 124 as shown (described further below). The mirrors are positioned along the vertical plane (z-axis) in a manner that the received light fills the area of the sensor with minimal overlap between fields. In an embodiment, the camera can be oriented (rotated about its optical axis) at 90 degrees to a standard imaging orientation so that the image on each "side" of the sensor" is in fact a top image and a bottom image. This can assist in processing the image where the camera processor typically processes image data from top to bottom. The housing 142 (and lens assembly zoom, if applicable) can be adjusted along the z-axis to ensure optimal viewing of each side of the object surface. By way of example, the object surface 110 can be located so that the distance VD is between approximately 10 and 20 centimeters. The mirrors 172, 174 are positioned at a width WPM of approximately 3 and 10 centimeters. The beam splitter mirrors can be oriented so that the angle AM1 is approximately 22.5 degrees (but otherwise variable in alternate arrangements—depending upon the overall geometry of the system) and they are spaced at a distance from the image plane that is appropriate to obtain the desired optical effect. These values are highly variable in alternate embodiments and the size of each mirror should be sufficient to fully image the laser line at the chosen viewing distances, as determined in accordance with skill in the art.

Figure 2:
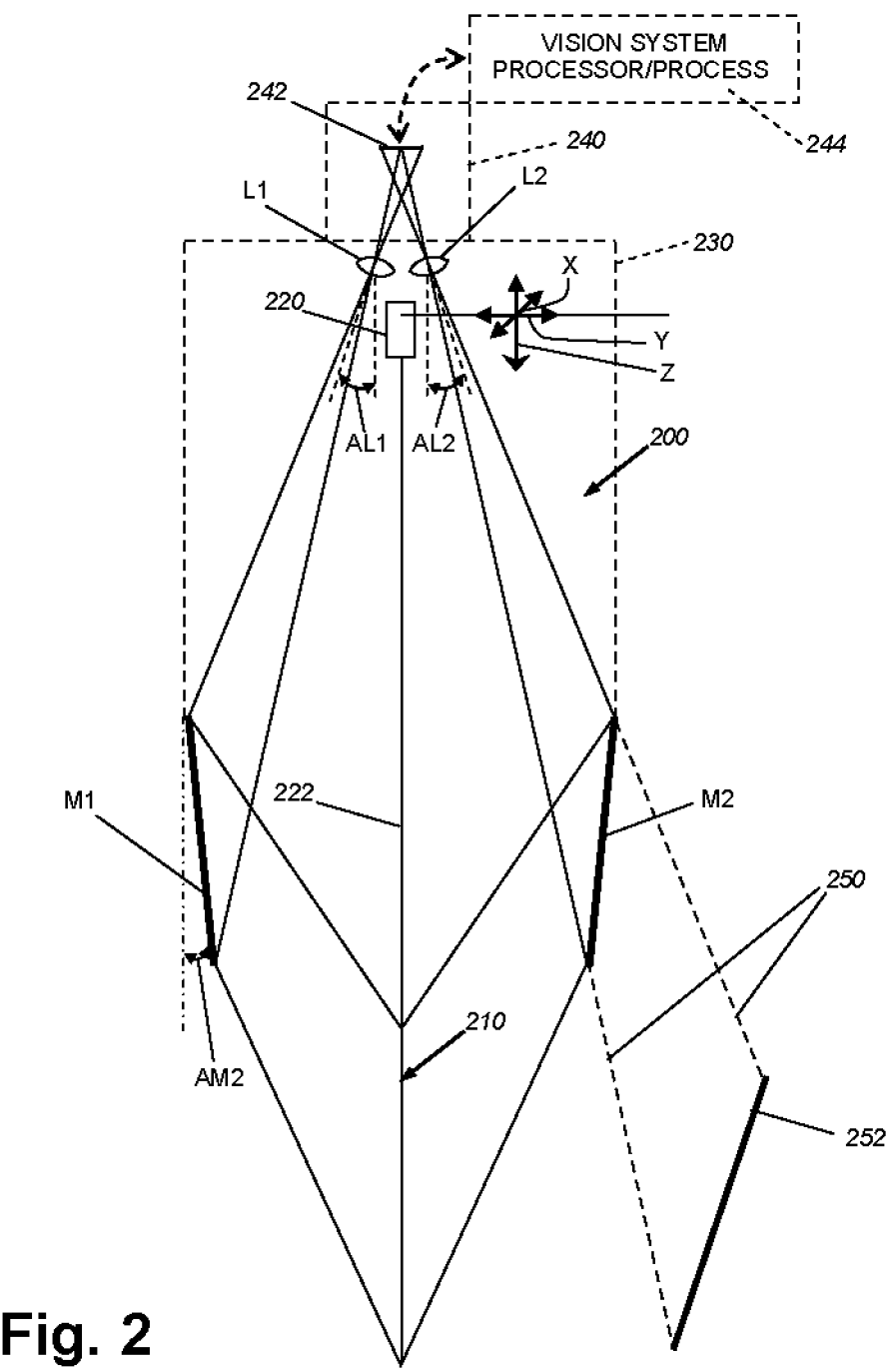
FIG. 2 is a schematic side view of another illustrative embodiment of a 3D laser capture system using two discrete lenses in conjunction with a single camera.

FIG. 2 details a system 200 according to a further illustrative embodiment that omits a beam splitter, and employs a pair of lenses 212 and 214 to project an image from each side of the line 210 projected by a forwardly placed (along the z-axis) laser 220 with appropriate optics to project a fan/curtain 222 onto an object surface (not shown). The system 200 is contained within an appropriate housing 230 (shown in phantom) that removably (in this embodiment) attaches to the housing of a vision system camera 240. The camera 240 includes a sensor 242 and processing arrangement 244 as described generally above. A pair of mirrors M1 and M2 direct received light, respectively from the region of the laser line 210 on each side of the object surface to the lenses L1 and L2. These lenses L1 and L2 are arranged with optical axes each at respective, opposing acute angles AL1 and AL2 relative to the z-axis and at a distance from the sensor 242 that focuses the image on each of adjacent sides of the sensor 242. The angles AL1, AL2, L1 and L2 are adapted to satisfy the Scheimpflug principle. In particular, the angular orientation of each mirror M1 and M2 is adapted to direct light from a centered, single laser line 210 in the same manner that a more conventional offset projected laser line 252 would be directly viewed. Such a directly viewed arrangement is taught in commonly assigned U.S. patent application Ser. No. 13/468,704, entitled LASER PROFILING ATTACHMENT FOR A VISION SYSTEM CAMERA, by Laurens Nunnink, the teachings of which are incorporated herein by reference as useful background information. The depicted system 200 of FIG. 2, thus, enables the functionality of a pair of such profilers to be contained within a single housing 230, employing a single central laser 220 and camera assembly 240. In an embodiment, the focal length of the lenses L1 and L2 is approximately 21-22 millimeters, and the system 200 has a working viewing distance of between approximately 129 and 189 millimeters. Object resolution within that range varies from approximately 0.111 millimeter/pixel and 0.222 millimeter per pixel.

Note that in each of the above-described arrangements, the laser is oriented along a plane that is substantially perpendicular to a plane of motion and/or plane of orientation of the object surface. This ensures that any deviation of the laser line across the surface on each side of the object remains equivalent and that this deviation is fully proportional to z-axis height differentiation on the surface. In general, the viewing angle of the arrangement with respect to the region that encompasses each side of the laser line is in a range of approximately 10-20 degrees, but shallower or deeper angles are expressly contemplated in alternate embodiments. This depends in part on the desired overall width of the head.

Figure 3:
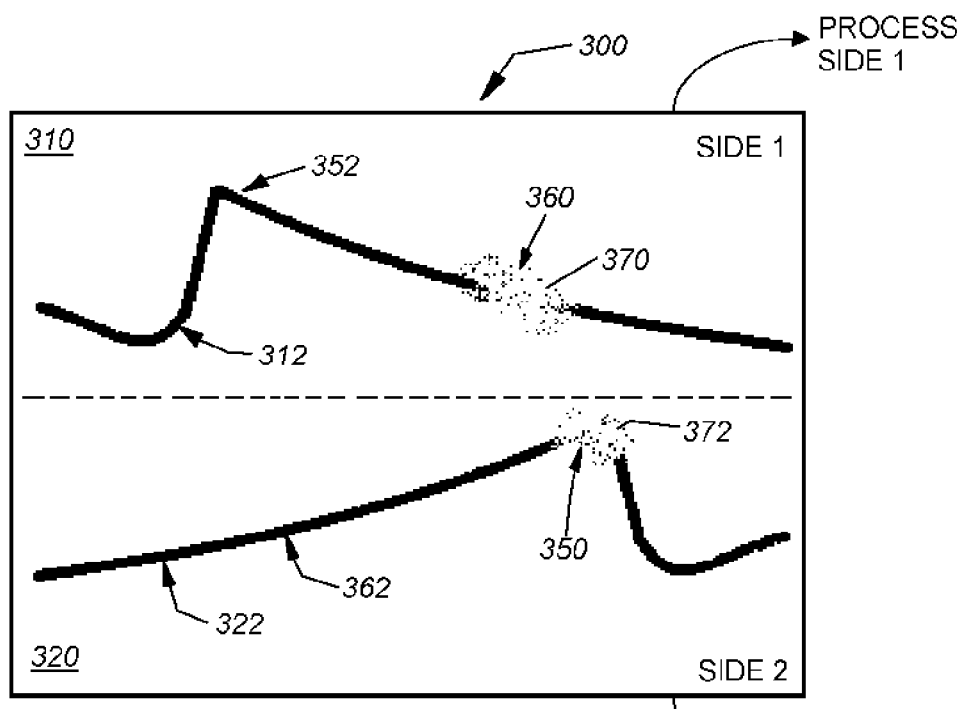
FIG. 3 is a schematic diagram of the camera image sensor of the illustrative embodiments showing the projection of the captured image from each opposing viewing angle onto two discrete sides of the sensor.

With reference to FIG. 3, the image projected on the sensor area 300 in accordance with the various embodiments herein is depicted schematically. As described above, the sensor is divided into two discrete regions 310 and 320 associated with each respective side/viewing angle of the imaged, exemplary laser line (312 and 322, respectively). To a viewer, the exemplary laser line would appear generally as mirror images about a line orthogonal to the profile direction. The two sides can be processed discretely as shown. As noted above, the representation of FIG. 3 can define a 90-degree rotation (stacked horizontal strips), in which the first side (Side 1) 310 is oriented adjacent to the top of the camera sensor and the second side (Side 2) 320 is to the bottom of the camera sensor area 300. Notably, the capture of the image of the two sides of the surface can occur in precise synchronization as the same sensor area is exposed to both sides concurrently (substantially simultaneously). Thus, there is no error introduced as a result of latency between the acquisition of the image of each side (which can include a varied degree of motion, noise, etc.).

As depicted in FIG. 3, the overall image captured by the sensor appears with certain inconsistencies between each side. For example on Side 2, a portion of the line has been shadowed, resulting in a discontinuity 350 that is not present in the counterpart segment 352 of Side 1. Similarly, the discontinuity 360 of the line 312 of Side 1 is represented as a complete, unbroken segment 362 along the line 322 of Side 2. Likewise, noise 370 and 372 on each line 312 and 322 is minimal or absent from the counterpart region on the other line. This allows such noise in each line to be filtered/attenuated based upon the opposing, strong line signal on similar regions of the opposing line.

Figure 4:
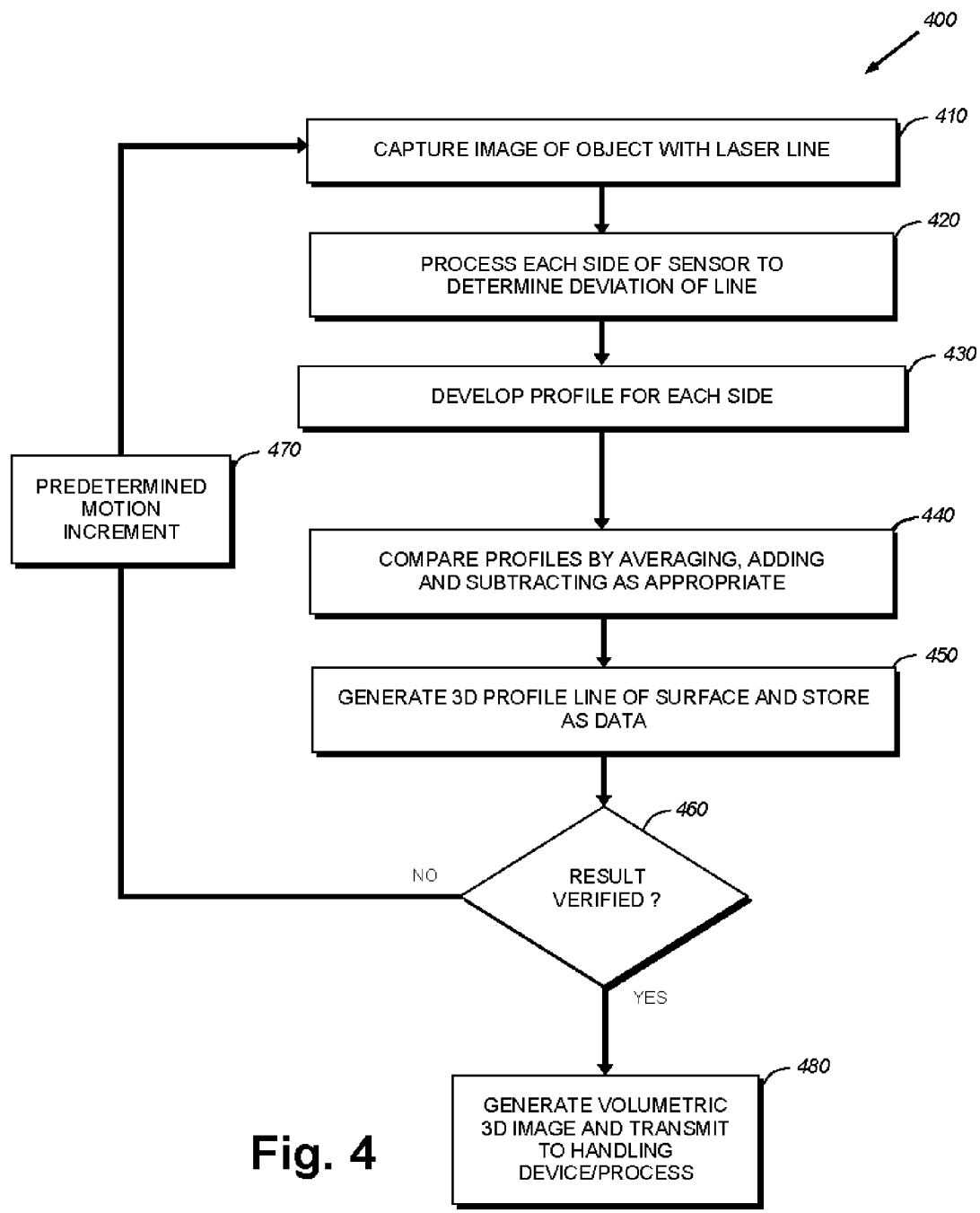
FIG. 4 is a flow diagram of a procedure for generating profile data of an object surface based upon images of the laser line from two opposing sides.

The two imaged sides (i.e. images concurrently acquired from opposing viewing angles) can be processed by the processing assembly of the vision system as shown in the procedure 400 of FIG. 4. As part of the process, corresponding regions of the line of each side are associated with each other—that one of the lines is translated so that its image data is lined up with that of the other line. A profile process 170 (FIG. 1) is provided in conjunction with the overall vision process to perform the procedure 400. In step 410, an image frame of the object surface is captured by the vision system camera. Image acquisition can be based upon an external trigger that can be issued by an encoder interconnected with a drive system of a moving line that carries the object through the system field of view. This encoder signal transmits a pulse for each predetermined motion interval, and one or more predetermined pulses are used to generate a trigger signal.

In step 420 of the procedure 400 (FIG. 4), the vision processor processes each side of the sensor's acquired image data to determine the relative deviation of the laser line in each "sub-image" (i.e. each side). The processing of the image data can include use of, for example, edge detection algorithms to determine contrast differences between the line and its surrounding field, as well as profile processes that determine any data specific to a profile measurement of such edge data. For example, the degree of deviation can be compared to a scale that provides actual height measurements for various features—based upon where a given segment of the line resides in the field of view. This scale can be derived, at least in part, from trained height information provided during training and calibration of the system. From this data a body of profile information for each side can be derived in step 430.

In step 440, the profile data generated with respect to each side is compared. Various processes can be employed to combine and filter the data (e.g. adding, subtracting and averaging the data of one side with respect to the other). For example, the two data sets can be averaged with appropriate statistical filtering algorithms that eliminate obvious noise and artifacts. Where a line segment is truncated due to shadowing in one image, but the full segment is present in another, then that full segment can be added to the data set. A variety of algorithms can be employed. These can act on raw image data or data that has been resolved into a height-based data set, or both. In further embodiment, the process can analyze one side and, if sufficiently free of potential inaccuracies, either use that side as the final profile without analyzing the other side; or the process can use the image/profile of the one (presumed accurate) side to analyze some or all of the other side's data for potential variations. Likewise, a comparison between a perceived accurate image on one side and the image of the other side may determine if there is a registration error between images, thus assisting in diagnosing potential problems within the systems setup and/or optical arrangement.

Figure 5:
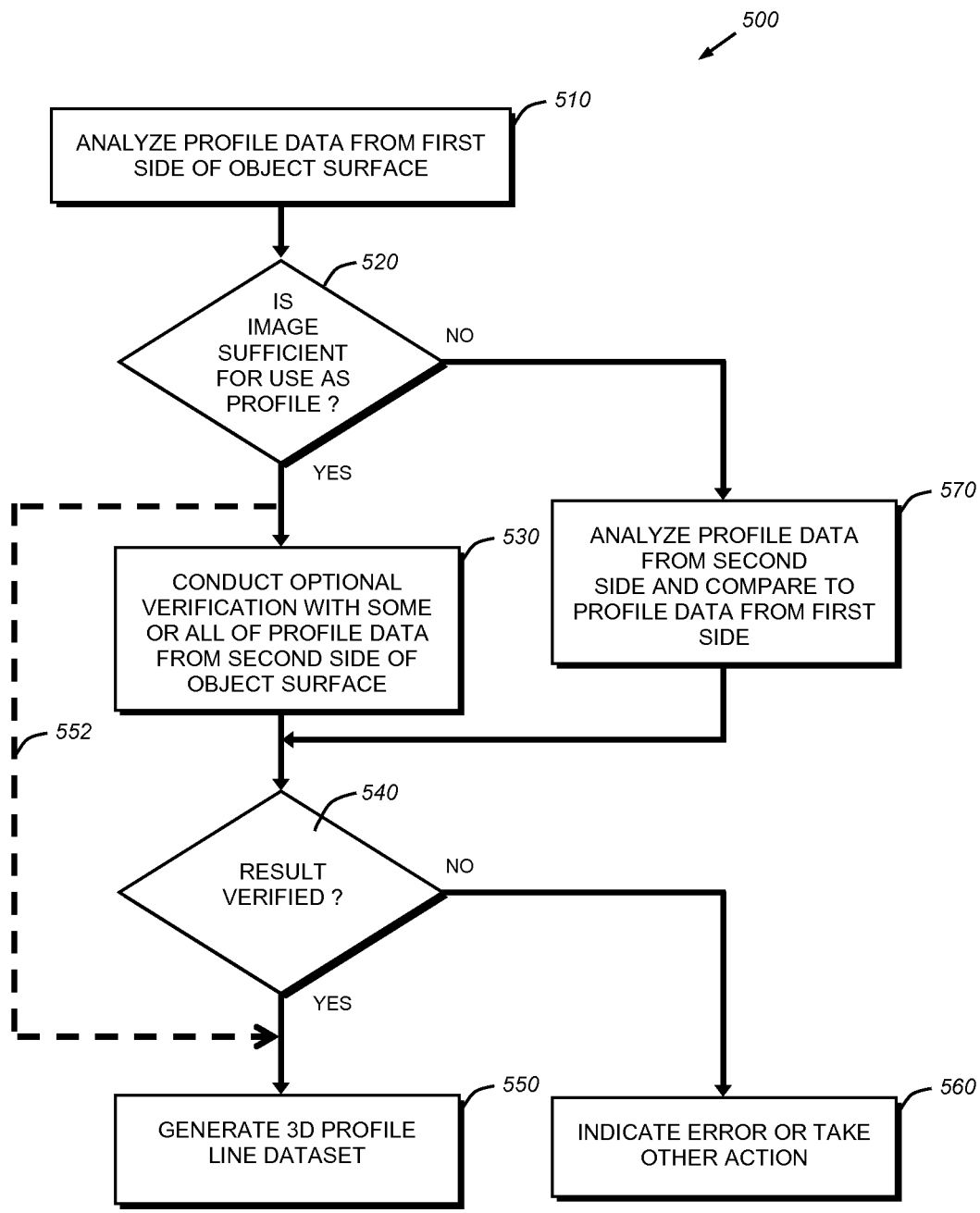
FIG. 5 is a flow diagram of an illustrative procedure for comparing profile data of one side of the imaged object surface to that of another side to generate a final 3D profile result in accordance with the procedure of FIG. 4.

An illustrative comparison step 440 is shown and described in further detail with reference to the procedure 500 of FIG. 5. In an embodiment, the procedure 500 analyzes profile data from a first side of the object surface in step 510. This side can be chosen arbitrarily, based upon the general known characteristics of images for each side (i.e. it is known that one side tends to produce less-shadowed images), or based upon a prior analysis of which side appears to contain minimal discontinuities and/or noise. The analysis determines whether the particular profile data is sufficiently free of discontinuities and noise to provide reliable data in decision step 520. If the data is sufficient, an optional verification step 530 can be performed using the profile data from the second, opposing side. This verification can comprise a comparison of the first side's data to that of the second. If needed appropriate filtering, adding and subtracting of data can be performed as described above. If the final resulting 3D profile data is sufficient, the decision step 540 can direct a final 3D profile result—either from the verified first side or a combination of the first and the second side's data to be generated in step 550. Alternatively, where the data of the first side is sufficient to provide a final profile, the decision step 520 can skip optional verification step 530 and decision step 540 (via dashed-line branch 552) to provide the first side's profile data as the final 3D data in step 550. If the result cannot be verified, then the system indicates an error to the user, or takes other action (via decision step 540 and step 560) as appropriate. Such other action can include a rescan of the object surface, and/or further comparison and analysis steps.

If in decision step 520, the procedure 500 determines that the profile data of the first side is not sufficient to use as a final profile—due to inaccuracies, shadows, noise, etc., then the decision step branches to step 560, where the profile data of the second side is analyzed and the data of both sides is fully compared to generate a combined data set. If this data set is sufficient, the decision step 540 passes this result to step 550 for use as the final data set containing the 3D profile line—which represents a slice of the overall object. Otherwise, an error is indicated per step 560. It should be clear that the procedure 500 is illustrative of a wide range of possible techniques for analyzing and processing the data from each side of the object surface.

With reference again to FIG. 4, the procedure 400 obtains the profile line data computed by step 440, and in step 450 (and associated procedure 500), generates and stores the 3D line data for that incremental "slice" of the surface. In decision step 460, the procedure 400 determines if the surface has been fully profiled. This can occur when the object moves fully through the camera field(s) of view. If more slices are to be scanned and profiled, then the system increments the relative motion between object and laser/camera by a predetermined amount (step 470), and another image is captured at step 410. The procedure then repeats steps 420-460. Once the profile is complete, decision step 460 branches to step 480, and the set of 3D lines is combined into an overall 3D volumetric image of the object surface. This data can be transmitted to downstream data handling devices/procedures for use in subsequent manufacturing and/or other processes.

It is contemplated that the image data related to each side/viewing angle can be processed successively by the vision system processor, or simultaneously in the case of a parallel-processing (e.g. multi-core) arrangement. To the extent that the division of the sensor causes reduced (i.e. halved) resolution, a variety of techniques and hardware implementations can compensate for such. For example, the resolution of the sensor, scan rate and/or associated processor speed can be increased.

It should be clear that the illustrative embodiments enable the vision system to more accurately profile in 3D a variety of challenging surface shapes—for example gear teeth that are typically visible from only one side—by providing an addition, opposing view of such surfaces that effectively "fills in" missing image data and allows for a combined set of profile data that generally provides a complete profile of the object surface. Such combined data also enables various comparison processes to filter out noise, by omitting profile data from one side that conflicts with a more-predictable set of data from the other side, or that, when both sides are combined renders a more-reliable result. These embodiments, moreover, enable the system to be encased in a removably attached housing or "head" that alleviates many potential inaccuracies due to set up of a plurality of optical components, as such components are permanently fixed within a housing structure—thus, the user is mainly tasked with appropriately mounting the head with respect to the camera assembly, and properly orienting this overall system assembly with respect to the imaged scene/object.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and orientational terms such as "vertical", "horizontal", "up", "down", "bottom", "top", "side", "front", "rear", "left", "right", and the like, are used only as relative conventions and not as absolute orientations with respect to a fixed coordinate system, such as the acting direction of gravity. In addition, in various embodiments, the laser can be subjected to a beam splitter to generate a pair of beams that strike the object surface from two discrete angles. Also, while the components of the system are shown mounted in an integral housing, the components can be divided into multiple housings or provided on a plurality of discrete mounting assemblies along the optical path of the system. Accordingly, this description is meant to be taken only by way of example, and not to otherwise limit the scope of this invention.

What is claimed is:

1. A system for three-dimensional (3D) capture of a profile of an object surface using a vision system camera having an image sensor defining an image plane, the system comprising:
    a laser assembly generating a fan of laser light constructed and arranged to project a laser line on an object surface;
    an optical assembly, in optical communication with the vision system camera, constructed and arranged to direct light reflected from a first viewing angle of a region of the object surface that includes the laser line and a second, opposing viewing angle of the region of the object surface that includes the laser line, the light from each of the first viewing angle and the second viewing angle being projected on a first area and a second area of the image sensor, respectively; and
    a profiling process that compares the image data of the first area and the image data of the second area and generates a 3D profile line with respect to the object surface therefrom.

2. The system as set forth in claim 1 wherein the fan of laser light resides substantially along a plane perpendicular to the image plane.

3. The system as set forth in claim 1 wherein the optical assembly comprises a beam splitter receiving light from a pair of spaced-apart mirrors located between the beam splitter and the object surface, the beam splitter directing light through a lens assembly of the vision system camera.

4. The system as set forth in claim 3 wherein the spaced-apart mirrors are oriented at similar angles with respect to a plane defined by the fan of laser light.

5. The system as set forth in claim 1 wherein the optical assembly comprises a pair of lenses each oriented with an optical axis at an opposing acute angle with respect to a plane defined by the fan of laser light, each of the lenses receiving light from respective of a pair of spaced-apart mirrors located between the lenses and the object surface.

6. The system as set forth in claim 5 wherein, for each of the first viewing angle and the second viewing angle, in combination, the plane defined by the fan of laser light, the optical axis of a respective one of the lenses and the image plane satisfy the Scheimpflug condition.

7. The system as set forth in claim 1 wherein the optical assembly and the laser assembly are located within a housing that is removably attached to a housing of the vision system camera at a predetermined distance from the image plane.

8. The system as set forth in claim 1 wherein the vision system camera is constructed and arranged to acquire a plurality of images of the object surface as at least one of the object surface and the laser line move with respect to each other.

9. The system as set forth in claim 7 wherein the laser line is stationary and the object surface moves with respect to the laser line along a plane perpendicular to a plane defined by the fan of laser light.

10. The system as set forth in claim 1 wherein the profiling process is constructed and arranged to at least one of (a) reconstruct shadow regions of an image of the laser line and (b) filter noise associated with the image of the laser line based upon a comparison of at least part of the image data of the first area and at least part of the image data of the second area.

11. A method for capturing a three-dimensional (3D) profile of an object surface using a vision system camera having an image sensor defining an image plane, the method comprising the steps of:
    generating a fan of laser light to project a laser line on an object surface;
    directing light reflected from a first viewing angle of a region of the object surface that includes the laser line and a second, opposing viewing angle of the region of the object surface that includes the laser line, so that the light from each of the first viewing angle and the second viewing angle is projected on a first area and a second area of the image sensor, respectively; and
    comparing the image data of the first area and the image data of the second area and generating a 3D profile line with respect to the object surface therefrom.

12. The method as set forth in claim 11 further comprising projecting the fan of laser light substantially along a plane perpendicular to the image plane.

13. The method as set forth in claim 11 wherein the step of directing includes providing a pair of lenses each oriented with an optical axis at an opposing acute angle with respect to a plane defined by the fan of laser light, each of the lenses receiving light from respective of a pair of spaced-apart mirrors located between the lenses and the object surface.

14. The method as set forth in claim 13 further comprising providing a housing for the pair of lenses, the spaced-apart mirrors and the laser assembly and removably attaching the housing to a housing of the vision system camera at a predetermined distance from the image plane.

15. The method as set forth in claim 11 further comprising acquiring, with the vision system camera, a plurality of images of the object surface as at least one of the object surface and the laser line move with respect to each other.

16. The method as set forth in claim 15 wherein the laser line is stationary and the object surface moves with respect to the laser line along a plane perpendicular to a plane defined by the fan of laser light.

17. The method as set forth in claim 11 further comprising at least one of (a) reconstructing shadow regions of an image of the laser line and (b) filtering noise associated with the image of the laser line based upon a comparison of at least part of the image data of the first area and at least part of the image data of the second area.

18. The method as set forth in claim 11 wherein the step of directing includes providing a beam splitter receiving light from a pair of spaced-apart mirrors located between the beam splitter and the object surface, the beam splitter directing light through a lens assembly of the vision system camera.

19. The method as set forth in claim 18 further comprising providing a housing for the beam splitter, the spaced-apart mirrors and the laser assembly and removably attaching the housing to a housing of the vision system camera at a predetermined distance from the image plane.

* * * * *